United States Patent Office 3,491,491
Patented Jan. 27, 1970

3,491,491
ALUMINOUS SLURRIES CONTAINING FERRIC
AMMONIUM CITRATE
Herbert F. G. Ueltz, Youngstown, N.Y., assignor, by mesne assignments, to U.S. Industries, Inc., New York, N.Y., a corporation of Delaware
No Drawing. Filed Jan. 15, 1968, Ser. No. 697,599
Int. Cl. B24d 3/00; C09c 1/68; C04b 31/00
U.S. Cl. 51—309                                5 Claims

ABSTRACT OF THE DISCLOSURE

An aqueous milled slurry of calcined bauxite, or mixtures of calcined bauxite and Bayer process alumina having a high solid content and low water content by reason of the presence of ferric ammonium citrate or ferric ammonium citrate and citric acid for use particularly in the formation of sintered abrasive grains.

CROSS REFERENCES

This invention relates to one step in a process disclosed by applicant in co-pending application, Ser. No. 697,905 entitled "Abrasive and Method of Making the Same" filed substantially the same date as this application.

BACKGROUND OF THE INVENTION

In the formation of slurries for the above expressed purpose where calcined bauxite is mixed with water and milled to a state of fine sub-division, the mixture of calcined bauxite and water cannot contain above about 45 percent by weight of calcined bauxite without becoming too thick or viscous to pour or pump and this requires that a major percentage of water must be removed in drying the slurry after the ball mill operation. The productive capacity of the mill and drying equipment is limited by the relatively large volume of water which is included. This water is later to be removed by evaporative drying and discarded, and provides no contribution to the mass of useful product being manufactured. Much fuel energy is required to evaporate water, and it is highly desirable to use a minimum of water in the slurry.

It is also an object of the process of the application cited to produce as an intermediate product, a cake of high density by evaporatively drying the slurry. If a fluid slurry of milled calcined bauxite and water alone is dried, the density of the resulting cake is greatly inferior to that obtained by drying the high concentration slurry of this invention.

SUMMARY OF THE INVENTION

It has been found that aqueous milled slurries of calcined bauxite, or mixtures of calcined bauxite with Bayer process alumina with sufficient fluidity to pump or pour may be obtained by incorporating ferric ammonium citrate or ferric ammonium citrate and citric acid, and these slurries may be of very high concentration of solids. The concentration of solids may be approximately 78 percent by weight of the slurry and the water content as low as about 20.8 percent of the weight of the slurry. Slurries of this concentration will still have a surprisingly high fluidity and are pumpable and pourable. Such slurries may be dried by the evaporation of the water and will result in dry cakes of high density and coherence, being of sufficient mechanical strength to withstand normal mechanical handling in processing without excessive attrition, and in all other respects eminently suited for the production of sintered abrasive grain by co-pending process, Ser. No. 697,905.

DESCRIPTION OF THE PREFERRED EMBODIMENT

Bauxite is a natural, impure hydrous alumina. It is normally calcined to drive off the associated water. In the preparation of my slurries, I use calcined bauxite. For the purposes of this invention, the calcined bauxite may be used as such, or it may be mixed with Bayer process alumina in amounts up to 60 percent by weight of the mixture. Hereinafter mixtures of calcined bauxite with Bayer process alumina shall be understood to come within the meaning of the term calcined bauxite.

I prefer to use calcined bauxite from Surinam but calcined bauxite from other areas will be suitable. The chemical composition of calcined Surinam bauxite will vary somewhat but a representative analysis will be:

|  | Percent by wt. |
|---|---|
| $Al_2O_3$ | 86.72 |
| $SiO_2$ | 3.30 |
| $Fe_2O_3$ | 5.28 |
| $TiO_2$ | 3.73 |
| Loss on ignition | 0.97 |
|  | 100.00 |

Bayer process alumina is a white purified form of aluminum oxide, provided typically in a fine granulated state. A representative chemical analysis is:

|  | Percent by wt. |
|---|---|
| $Al_2O_3$ | 99.2 |
| $SiO_2$ | 0.02 |
| $Fe_2O_3$ | 0.03 |
| $Na_2O$ | 0.45 |
| Loss on ignition | 0.2 |

Calcined bauxite, as hereinbefore defined, is comminuted until it is of satisfactory size for ball mill feed. This may be about 30 mesh and finer, and calcined bauxite may be reduced to this size by conventional equipment such as by roll crushing. When calcined bauxite is used for other purposes such as for electric furnace abrasives, the finest size particles may simply be screened out of the calcined bauxite and are suitable for purposes of this invention without crushing.

The comminuted calcined bauxite is put in a ball mill which may be of the rotating or vibratory type. Also introduced into the ball mill are water and ferric ammonium citrate. Citric acid may be added if desired and I normally prefer to include it in the slurry formulation. The proportions of the ingredients based on the whole slurry may vary within the ranges shown.

|  | Percent by wt. |
|---|---|
| Calcined Bauxite | 45 to 80 |
| Water | 55 to 20 |
| Ferric ammonium citrate | 0.2 to 4.0 |
| Citric acid | 0 to 0.5 | and I prefer to make slurries containing a very high content of calcined bauxite, and as an example I have found the following formulation to be very satisfactory.

|  | Percent by wt. |
|---|---|
| Calcined bauxite | 78.0 |
| Water | 20.8 |
| Ferric ammonium citrate | 1.2 |

Another example of a satisfactory slurry is:

| | |
|---|---|
| Calcined bauxite | 77.9 |
| Water | 20.8 |
| Ferric ammonium citrate | 1.2 |
| Citric acid | 0.1 |

The mixture of specified ingredients in the cited proportions is ball milled. Ball mills of conventional design may be used, and these are of the rotating or vibrating type. If a rotating type is used, I prefer that it be lined with a ceramic lining although an unlined mill may also be used. The preferred grinding media is ceramic balls or rods. Steel balls may be used but are not preferred since the metal worn off of them in milling has been found to degrade the dispersing action of the ferric ammonium citrate. The amount and size of media as well as the amount of slurry charge put in the mill depends on the mill size, type, and speed of rotation. Choice of media size and amount as well as the quality of slurry being milled at one time will be established by experiment and reference to well known principles of good practice.

In milling, a certain amount of heat is generated and excessive heat adversely affects the dispersing action of ferric ammonium citrate. Where the operating conditions of the mill cause excessive heating, cold water may be flowed over the exterior surfaces of the mill while operating and this will keep the mill contents relatively cool.

As an example of a successful reduction of this invention to practice, a quantity of slurry was made in a horizontal rotating mill. This mill was made of steel plate and was not lined. The mill was 48 inches long and 54 inches inside diameter, and rotated at 26 revolutions per minute. As milling media, 3,000 pounds of $1\frac{3}{16}$ inch long by $1\frac{3}{16}$ inch diameter alumina ceramic rods were put in the mill. The slurry mixture consisted of 750 pounds of comminuted calcined Surinam bauxite, 200 pounds of water, 11.5 pounds of ferric ammonium citrate, and 1.0 pound of citric acid. The mill was rotated for 24 hours at a rate of 26 revolutions per minute. The exterior of the mill was flooded with cold water to dissipate excessive heat. When milling was completed, the slurry was removed from the mill and it was found to be very fluid and pourable despite a solids content of close to 78 percent by weight. The average size of the calcined bauxite particles was measured at two microns.

This slurry was poured out in a thin layer and dried. The resulting dry cake had a density of 2.12 gm./cc. and was coherent and mechanically strong. Some milled calcined Surinam bauxite which had been milled to substantially the same particle size in water only (40% calcined bauxite by weight) was dried and the resulting soft cake was found to have a density of only 1.22 gm./cc. When this cake was pulverized and the resulting powder compacted in a steel die at 5 tons per square inch, the density of the compacted cake was 1.68 gm./cc. It is apparent that drying the slurry of this invention gave a cake having a substantially higher unsintered density than was obtained by compression of milled calcined bauxite powder at 5 tons per square inch, and it was only necessary to dry it to a solid without any pulverization or compression at all.

The remarkable dispersing power of ferric ammonium citrate in calcined bauxite slurries is not yet well understood. The empirical formula of ferric ammonium citrate is $Fe_2(NH_4)_3 (C_6H_5O_7)_3$ but the composition may vary considerably from this. It may be described generally as an internally complex coordination compound of the ammino type. It is believed that the molecular arrangement is such that there is an effective separation of charges in which positively charged ammonium groups are absorbed onto the oxygens in the surface of the aluminum oxide particles. The negatively charged iron-citrate groups are thus oriented outwardly from the surface and comprise an electrical double layer which effectively renders all the aluminum oxide particles negatively charged. Dispersion results from the mutual repulsion of all particles. Such an interpretation must be speculative at present.

Further examples of slurries of this invention are:

| | Percent by wt. |
|---|---|
| Calcined bauxite | 72.8 |
| Water | 26.4 |
| Ferric ammonium citrate | 0.8 |
| Bayer process alumina | 38.1 |
| Calcined bauxite | 38.1 |
| Water | 23.0 |
| Ferric ammonium citrate | 0.8 |

Both of these slurries were entirely satisfactory for use in the manufacture of sintered abrasives by the process of co-pending application No. 697,905.

I claim:
1. An aqueous slurry consisting of from 45 to 80 percent by weight of calcined bauxite, from 20 to 55 percent by weight of water, and from 0.2 to 4.0 percent by weight of ferric ammonium citrate which has been milled to reduce the solid particles to an average size of 7 microns or less.

2. An aqueous slurry as in claim 1 wherein Bayer process alumina may comprise up to 60 percent by weight of the calcined bauxite.

3. An aqueous slurry as in claim 1 wherein there is included from 0 to 0.5 percent by weight of citric acid.

4. An aqueous slurry as in claim 2 wherein there is included from 0 to 0.5 percent by weight of citric acid.

5. An aqueous slurry consisting of from 72.0 to 79.0 percent by weight of a group consisting of calcined bauxite and Bayer process alumina in which the Bayer process alumina may be from 0 to 60 percent by weight of the combined calcined bauxite and Bayer process alumina, from 20.7 to 27.0 percent by weight of water, from 0.6 to 1.2 percent by weight of ferric ammonium citrate, and from 0 to 0.2 percent by weight of citric acid, which has been milled to reduce the solid particles to an average size of 4 microns or less, said slurry being pumpable.

References Cited

UNITED STATES PATENTS

| 2,235,880 | 3/1941 | Hutchins | 51—308 |
| 2,725,286 | 11/1955 | Coes | 51—309 |
| 3,248,235 | 4/1966 | Pryor et al. | 106—3 |
| 3,357,951 | 12/1967 | Adams | 51—298 |
| 3,385,682 | 5/1968 | Lowen | 51—307 |
| 3,387,957 | 6/1968 | Howard | 51—298 |

DONALD J. ARNOLD, Primary Examiner

U.S. Cl. X.R.

106—65, 308; 252—313